United States Patent [19]

Galloway

[11] 3,799,027

[45] Mar. 26, 1974

[54] ANCHOR BOLT

[75] Inventor: Lawrence Henry Galloway, Barrington, Ill.

[73] Assignee: Illinois Tool Works Inc., Chicago, Ill.

[22] Filed: Apr. 3, 1972

[21] Appl. No.: 240,632

[52] U.S. Cl. .................................................. 85/79
[51] Int. Cl. ............................................. F16b 13/04
[58] Field of Search ................................. 85/79, 72

[56] References Cited
UNITED STATES PATENTS

| 2,440,038 | 4/1948  | Baker et al. | 85/79 |
| 3,277,770 | 10/1966 | McCulloch    | 85/79 |
| 3,021,745 | 2/1962  | Libon        | 85/79 |
| 2,774,273 | 12/1956 | Olson        | 85/79 |
| 3,472,120 | 10/1969 | Taylor       | 85/79 |

FOREIGN PATENTS OR APPLICATIONS

| 209,559   | 12/1966 | Sweden  | 85/79 |
| 901,525   | 1/1954  | Germany | 85/79 |
| 1,033,614 | 7/1958  | Germany | 85/79 |

*Primary Examiner*—Edward C. Allen

[57] ABSTRACT

An expansion bolt assembly including an elongated shank with one end of the shank having an expansion portion. The expansion portion of the shank comprises a wedge member which is mounted within a longitudinal inclined recess in the shank and secured in a preassembled fashion on the shank by arm members integrally mounted on the wedge and adapted to snap into a second recess in the shank.

2 Claims, 6 Drawing Figures

PATENTED MAR 26 1974 3,799,027
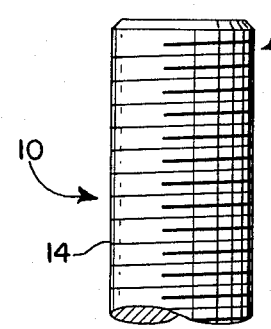
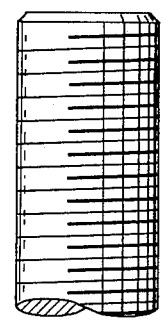
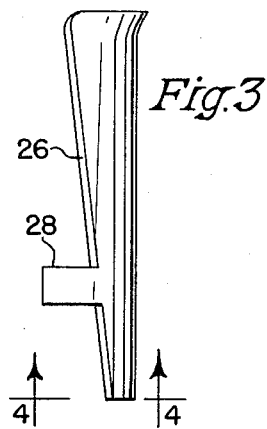
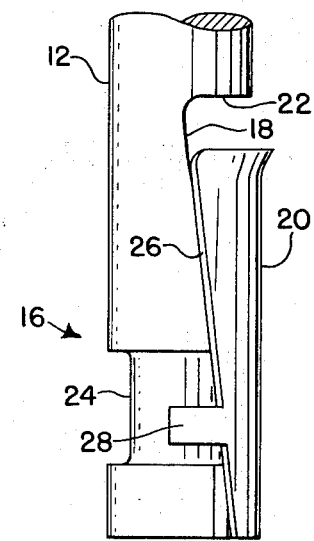
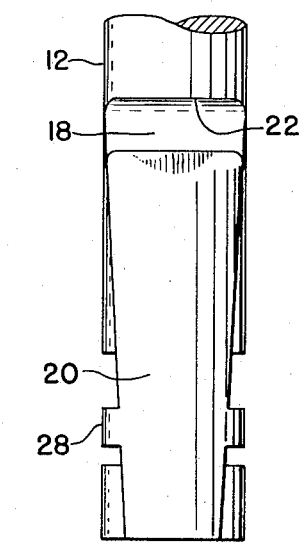
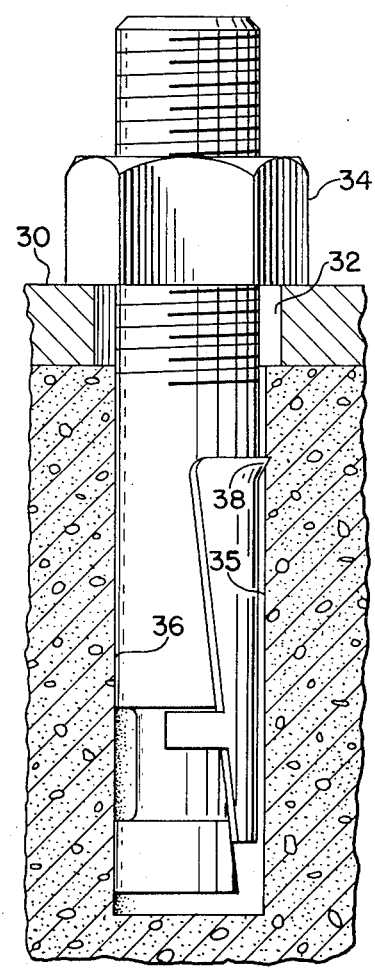
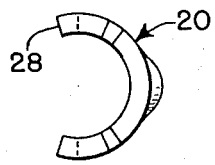

3,799,027

ANCHOR BOLT

BACKGROUND OF THE INVENTION

This invention relates to a novel wedge-type expansion bolt which is adapted to be firmly anchored within a blind hole.

Anchor bolts have been devised which utilize wedge members located in grooves or recesses on a bolt shank. These grooves may include an inclined bearing surface against which a wedge member or members are received so that when the bolt or shank is moved in a direction of withdrawal from a hole, the wedges are forced outwardly into engagement with the surface of the associated hole, thus tending to preclude complete withdrawal of the shank. The important aspects to be considered in the selection of such an expansion bolt include the ease of preassembly and shipment of such wedge actuated bolts and the pull-out strength of such an anchoring structure. The prior art is concerned with providing a cylindrical-type wedge member which completely encircles a portion of the shank of reduced diameter. The prior art in one instance utilizes a strip of flexible tape to hold a pair of wedge members together in a preassembled fashion on the shank. A multipiece bolt assembly is thus provided which presents numerous problems in assembly. In addition, the tape used in such an assembly may break in such a manner as to expand the wedges unevenly. Another disclosure utilizes a bolt having a parabola-like bearing surface which is relatively expensive to manufacture. In addition, the wedge members of this patent provide a point contact extending about the periphery of this parabola-like surface. Such a point contact does not result in satisfactory pull-out strength.

Other efforts to provide wedge-type expansion anchors have utilized a number of intricate interacting elements which are extremely expensive to manufacture and preassemble. Thus, the deficiencies of the prior art generally reside in the inability to provide a relatively inexpensive anchor which may be handled in a preassembled form, and which includes the capability to be subjected to relatively large forces which tend to pull the bolt from an associated hole.

SUMMARY OF THE INVENTION

It is an object of this invention to provide an anchor bolt having greatly increased holding power. It is another object of the invention to provide an anchor bolt assembly which includes a wedge member adapted to be readily preassembled and retained on an associated shank.

A further object of the invention is to provide an anchor bolt assembly which permits a relatively large surface area of an expansion bolt to be wedged into frictional engagement with an associated hole. It is still a further object of the invention to provide an expansion bolt assembly in which the expansion member is retained by the bolt without the use of additional elements.

The above and other objects and advantages of the present invention are incorporated in an expansion bolt assembly which includes an inclined recess at one extremity thereof which is particularly adapted to receive a stamped and hardened wedge member and which has a generally arcuate outer surface corresponding to the outer surface of the cylindrical bolt. The wedge also includes arms which are adapted to snap into complementary recesses extending about the periphery of the surface of the shank in the vicinity of the inclined recess.

BRIEF DESCRIPTION OF THE DRAWINGS

FIG. 1 is a side elevation view of the preassembled anchor bolt.

FIG. 2 is a front elevation view of the anchor bolt shown in FIG. 1.

FIG. 3 is a side elevation view of the wedge member utilized in the anchor bolt assembly.

FIG. 4 is an view of the wedge member shown in FIG. 3.

FIG. 5 is a front elevation view of the anchor bolt similar to that shown in FIG. 2, but without the wedge attached thereto.

FIG. 6 is a side elevation view of the anchor bolt assembly after it is inserted into an associated hole.

DESCRIPTION OF THE PREFERRED EMBODIMENT

Referring now to the drawings, there is shown in FIG. 1 an anchor bolt assembly 10 which includes a cylindrical shank 12 having a threaded portion 14 and which has an expansion portion 16 at the opposite end of the threaded portion. The expansion portion includes a recess 18 which is inclined upwardly and inwardly from a point at or near the end of the shank. The recess 18 includes a generally planar bearing surface which is adapted to slidingly associate with edges 26 on a wedge member 20. As shown in FIG. 1, the edge portion 26 of the wedge and the inclined bearing surface 18 cooperate to permit the wedge to expand radially outwardly of the shank portion and yet allow the outer surfaces of the wedge and the shank to remain in a parallel relationship to one another.

The wedge 20 is advantageously attached to the shank 12 by the use of arms 28 which extend from the edges 26 and generally conform to the arcuate outer surface of the wedge. The arcuate configuration of these arms is shown most clearly in FIG. 4.

The arms 28 are received in an annular recess 24 which intersects the inclined recess 18. This annular recess 24 may allow the wedge to slide longitudinally of the shank and yet remain attached to the shank.

It has been found advantageous to subject the wedge to conventional heat treating to harden the wedge and provide it with a spring-like characteristic. It may also be advantageous to form the wedge from pretempered steel or other steel which possesses spring-like qualities. Thus, the arms 28 may be readily snapped into the annular recess 24 for ease of handling and efficient operation of the expansion bolt. It has also been found to be advantageous to form the inclined recess 18 at an angle generally less than 15° to the longitudinal axis of the shank.

The arms will extend for more than 180° about the shank to insure that the wedge will be retained on the shank.

In operation, the wedge is snapped onto the shank in the manner described above and as shown generally in FIGS. 1 and 2. The expansion assembly 10 may thereafter be inserted in a predrilled hole 35 in an appropriate workpiece, such as concrete. The bolt may be also associated with a secondary workpiece, such as 32, which may be a plate or the like which is to be fastened to the concrete via the expansion bolt. As the bolt is inserted into an associated hole, the wedge may initially contact the inner surface of the hole through a radially extending projection, such as tip 38. This will provide an interference fit for the expansion portion and allows the wedge to slide upwardly toward shoulder 22 at the upper portion of the inclined recess. This ready position is shown in FIG. 6. As the bolt is slightly retracted, as by a complementary rotary threaded means, such as nut 34, the wedge tends to remain in its relative position in the hole while the shank moves upwardly. This relative longitudinal movement of the shank to the wedge causes the bolt and portion 16 to expand radially due to the sliding engagement of the edge 26 with the inclined surface 18. The expansion portion 16 will eventually create a tight friction fit between the wall of the hole and the bearing surfaces of the shank and arcuate wedge as the surface of the wedge 20 and bearing surfaces 36 of the shank are urged into intimate contact with surface 35 of the hole.

The provision of a wedge member having an arcuate outer surface, thus, enables the bolt 10 to provide a large peripheral area of frictional contact to the hole as the wedge is moved longitudinally relative to the bolt. This large area of frictional contact, thus, enables the pull-out strength of the anchor bolt assembly to be greatly increased over any prior art methods.

From the foregoing description, an anchor bolt of relatively simple yet durable construction is provided which is constructed of a shank having an inclined recess which is adapted to receive and to be operably associated with a hardened wedge member which includes arms which may be readily snapped into a second recess in the vicinity of the inclined recess.

While the invention has been described in connection with preferred embodiments, it will be understood that it is not intended to limit the invention to this embodiment. On the contrary, it is intended to cover all alternatives, modifications and equivalents that may be included within the spirit and scope of the invention as defined by the appended claims.

I claim:

1. An anchor bolt for use in a blind hole including a shank having an attachment portion at one end and an anchoring portion at the other end, the anchoring portion including a longitudinally disposed substantially planar bearing surface inclined inwardly from the extremity of the anchoring portion and terminating with a shoulder extending in a plane perpendicular to the axis of the shank an annular recess of limited axial extent located on the anchoring portion between said shoulder and the extremity of the planar bearing surface so that portions of the bearing surface are located on either side of the limited axial extent, said recess extending circumferentially of the anchoring portion and including shoulders at substantially right angles to the periphery of the anchoring portion, a thin walled wedge member having an arcuate outer surface tapering in width from an upper base portion to a lower tip portion and including a radially outwardly directed projection from the outer arcuate surface adjacent the upper base portion, the edge portions of the wedge being in bearing contact with the inclined bearing surface substantially along the entire axial extent of the wedge and supported at least at its opposite extremities by the bearing surface, the wedge including spring-like tabs of predetermined width less than the axial extent of the annular recess and preformed as extensions of the arcuate outer surface of the wedge, the arcuate configuration of the tabs conforming to the outer diameter of the annular recess so as to snap in the recess in close association therewith and encircle the recess a circumferential extent greater than 180° in a preassembled fashion and yet be attached to move axially within the limited axial extent of the recess as the wedge member slides longitudinally of the shank, the diameter of the attachment portion being substantially the same as the diameter of the anchoring portion, the segment of the anchoring portion radially opposing the wedge member be a substantially continous arcuate surface and extending at least 180° and generally corresponding and essentially forming a continuation of the arcuate surface of the wedge to provide a large, continuous circumferential and axial surface for affecting locking, frictional engagement with an associated blind hole as the wedge moves downwardly relative to the shank.

2. An anchor bolt in accordance with claim 1 wherein the ramp extends at an angle to the longitudinal axis less than 15°.

* * * * *